United States Patent
Rozanski, Jr. et al.

Patent Number: 5,974,057
Date of Patent: Oct. 26, 1999

[54] METHOD AND APPARATUS FOR CORRECTING A MEASURED ROUND-TRIP DELAY TIME IN A WIRELESS COMMUNICATION SYSTEM

[75] Inventors: Walter J. Rozanski, Jr., Hurst; Eric R. Schorman, Bedford, both of Tex.

[73] Assignee: Motorola, Inc., Schaumburg, Ill.

[21] Appl. No.: 08/941,783

[22] Filed: Sep. 30, 1997

[51] Int. Cl.$^6$ .................................................... H04J 3/06
[52] U.S. Cl. ............................................................ 370/519
[58] Field of Search .................................... 370/519, 310, 370/350, 342, 335, 320, 324, 318, 332, 333, 334, 503, 508, 509, 512, 515, 516, 517, 276, 296; 375/200, 208, 355, 356, 358; 455/13.4, 502, 522, 67.6, 69.6, 69, 132, 134, 135, 226.1, 226.2, 226.3

[56] References Cited

U.S. PATENT DOCUMENTS 4,607,257  8/1986  Noguchi .................................. 455/67.6
5,280,629  1/1994  Lo Galbo et al. ...................... 455/67.6

FOREIGN PATENT DOCUMENTS 565 507  10/1993  European Pat. Off. .

*Primary Examiner*—Dang Ton
*Attorney, Agent, or Firm*—Kenneth A. Haas; Mario J. Donato, Jr.

[57] ABSTRACT

Correction of a round-trip delay within a communication system (100) takes place by receiving an uplink communication signal (119) over uplink communication signal paths (130–132) and determining what ray was utilized by a remote unit (113) in time aligning the uplink communication signal (119). In particular, a base station (101) analyzes the uplink communication signal (119) and predicts the ray that the remote unit (113) utilized for time alignment. Once the base station (101) has determined the ray that the remote unit (113) utilized in time alignment, the base station (101) corrects any calculation of round-trip delay accordingly.

11 Claims, 4 Drawing Sheets

METHOD AND APPARATUS FOR CORRECTING A MEASURED ROUND-TRIP DELAY TIME IN A WIRELESS COMMUNICATION SYSTEM

FIELD OF THE INVENTION

The present invention relates generally to wireless communication systems and, in particular, to a method and apparatus for determining round-trip delay time in a wireless communication system.

BACKGROUND OF THE INVENTION

It is well known that a remote unit's location within a wireless communication system may be determined using a trilateration method. According to such a method, distances between the remote unit and multiple base stations are calculated based on a measurement of time delay of a signal traveling between the base station and the remote unit and then to each base station (round-trip delays). Such a prior-art method for calculating a remote unit's location is described in U.S. Pat. No. 5,508,708 "Method and Apparatus for Location Finding in a CDMA System" by Ghosh et al. and incorporated by reference herein. As described in Ghosh et al., when location of a remote unit is desired, the uplink signal transmitted from the remote unit to multiple base stations is analyzed to determine round-trip delay at each base station. From these delays, a distance is calculated from each base station to the remote unit, and the location of the remote unit is determined.

In a cellular environment, received signals undergo multipath scattering. In other words, a signal transmitted by a base station/remote unit undergo multiple reflections before being received at a receiver, and these reflections cause "echoes" (or copies) of the transmitted signal to be received by the receiver along with a non-reflected (or "prompt") component. These echoes are generally of different amplitudes and different time delays, and therefore cause received signals to actually consists of a multiplicity of signals (the actual signal and its echoes), each having a different amplitude, angle of arrival, and time delay. In a receiver incorporating the Electronic Industry Association/Telecommunications Industry Association Interim Standard 95A (IS-95A), a RAKE receiver is utilized to lock onto each of the several multipath rays of a received signal with individual RAKE "fingers." The receiver combines fingers together to form a demodulated information stream that is later decoded to recover the transmitted data. Internal to the RAKE receiver a "searcher" (or search processor) will have knowledge of the time offsets and pilot power for each finger. It is generally regarded in trilaterization that determining the time delay of the prompt or at least the earliest ray will result in the most accurate location prediction.

According to IS-95A, the remote unit's transmission of an uplink signal is required to be within ±1 µsec (microsecond) of the perceived first ray. Because of this, calculated propagation delay times utilized in remote unit location are assumed to be based off the remote unit transmitting within ±1 µsec of the prompt ray. Unfortunately, there exist situations in which the remote unit is unable to resolve the prompt ray. For example, the prompt ray may be attenuated in amplitude, or may be close enough in time to a subsequent ray that the receiver cannot resolve the prompt ray. In general IS-95A RAKE receivers are unable to separate rays that are closer in time than one chip time (approximately 800 nsec). Because of this, a remote unit may fail to time align to the prompt ray, causing an error to be introduced in any determination of round-trip delay time which results in an inaccurate determination of remote unit location (via trilateration). Therefore, a need exists for a method and apparatus for determining if a remote unit fails to adjust its transmission based on reception of the prompt ray, and compensating a measured round-trip delay accordingly.

DETAILED DESCRIPTION OF THE DRAWINGS

Figure 1:
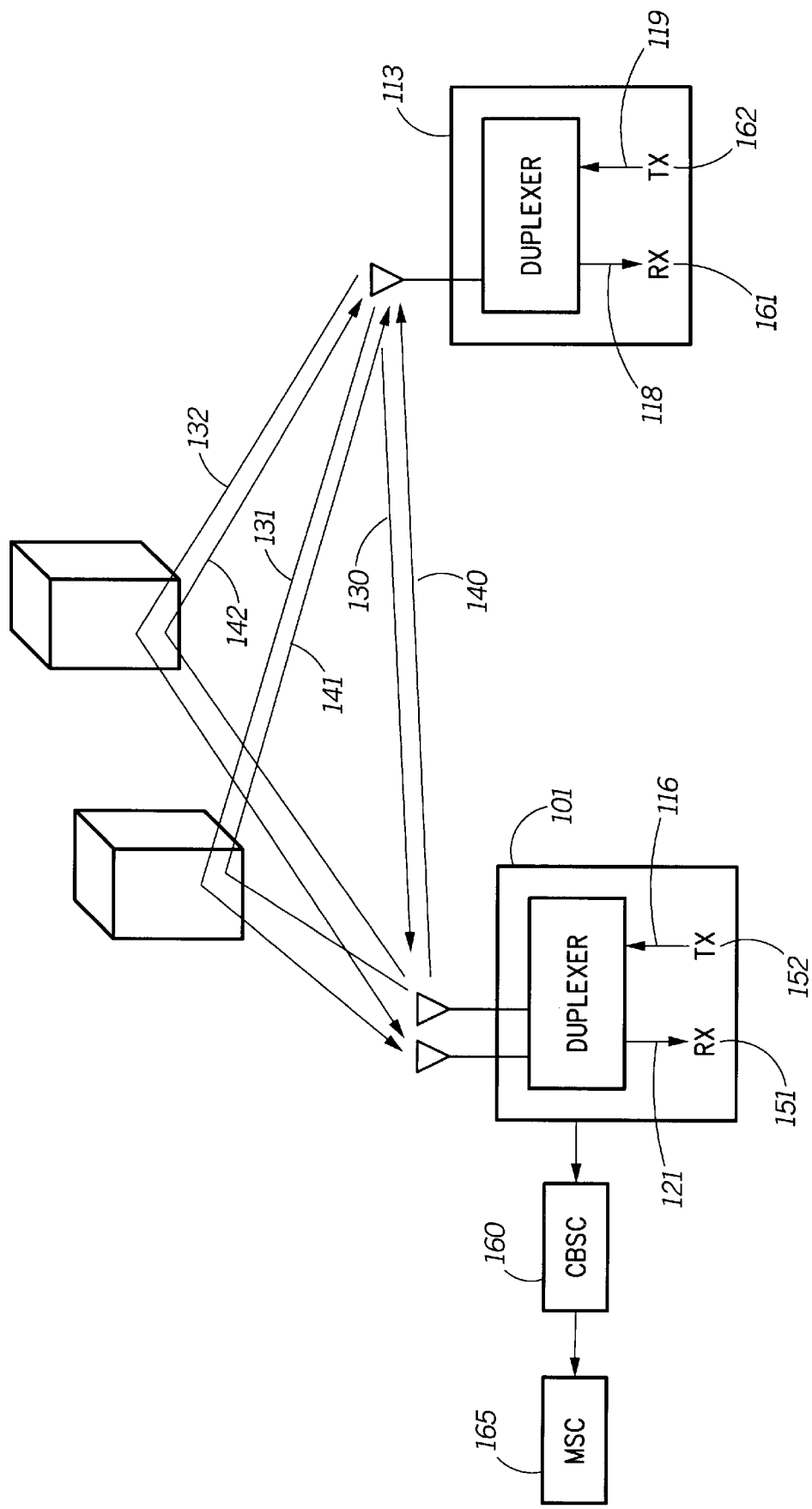
FIG. 1 is a block diagram of a communication system in accordance with the preferred embodiment of the present invention.

Stated generally, correction of a round-trip delay within a communication system takes place by receiving an uplink communication signal over uplink communication signal paths and determining what ray was utilized by a remote unit in time aligning the uplink communication signal. In particular, a base station analyzes the uplink communication signal and predicts the ray that the remote unit utilized for time alignment. Once the base station has determined the ray that the remote unit utilized in time alignment, the base station corrects any calculation of round-trip delay accordingly. By eliminating the error caused by remote unit failing to time align to the prompt ray, determination of round-trip delay time is improved, resulting in a more accurate determination of remote unit location (via trilateration).

The present invention encompasses a method for correcting a measured round-trip delay time of a signal transmitted in a wireless communication. The method comprises the steps of transmitting a first signal to a remote unit and receiving a second signal from the remote unit. The second signal (undergoing multipath scattering) is transmitted in response to the first signal being received at the remote unit. Next, a round-trip delay time is calculated and a correction factor in the round-trip delay time is calculated. In the preferred embodiment of the present invention, the correction factor is based on an arrival time of a prompt ray and an arrival time of a first ray with a power level above a power threshold. Finally, the round-trip delay time is corrected based on the correction factor.

The present invention additionally encompasses a method for correcting a measured round-trip delay time of a signal transmitted in a wireless communication. The method comprises the steps of receiving a signal having undergone multipath scattering, determining an arrival time (T1) for a prompt ray, determining an arrival time (T2) for a first ray with a power level above a power threshold, determining a time offset (dt) between the first ray with the power level above the power threshold and a ray with a power level above the power threshold received closest in time to the first ray, determining a correction factor based on the arrival time for the prompt ray, the arrival time for the first ray with the power level above the power threshold, and the time offset between the first ray with the power level above the power threshold and the ray with a power level above the power threshold received closest in time to the first ray, and correcting the round-trip delay time based on the correction factor.

Finally, the present invention encompasses an apparatus for correcting a measured round-trip delay time in a wireless communication system. The apparatus comprises a multipath identifier outputting multipath characteristics of a received signal, a logic unit having the multipath characteristics of the received signal as an input, and outputting a correction factor, the correction factor based on an arrival time for a prompt ray, an arrival time for a first ray with a power level above a power threshold, and a time offset between the first ray with the power level above the power threshold and a ray with a power level above the power threshold received closest in time to the first ray. The apparatus additionally comprises a location device having as an input the correction factor, and outputting a corrected round-trip delay.

The present invention can be more fully described with reference to FIGS. 1–5 wherein like numerals designate like components. FIG. 1 is a block diagram of a communication system in accordance with the preferred embodiment of the present invention. Wireless communication system 100 is preferably a cellular communication system that utilizes a Code Division Multiple Access (CDMA) system protocol, however, in alternate embodiments of the present invention communication system 100 may utilize any analog or digital system protocol such as, but not limited to, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 comprises base station 101 (having receiver 151 and transmitter 152), remote unit 113, Centralized Base Station Controller (CBSC) 160, and Mobile Switching Center (MSC) 165. Base station 101 has a common RF front end (not shown) which feeds independent rake inputs (not shown). As shown, remote unit 113 having receiver 161 and transmitter 162, is communicating with base site 101 via uplink communication signal 119 over uplink communication signal paths 130–132 and base site 101 is communicating with communication unit 113 using downlink communication signal 116 via downlink communication paths 140–142. A communication system utilizing the CDMA system protocol is described in detail in TIA/EIA Interim Standard IS-95A, which is incorporated by reference herein.

Operation of communication system 100 in accordance with the preferred embodiment of the present invention occurs as follows: Downlink communication signal 116 having undergone multipath fading over downlink communication paths 140–142, is received at remote unit 113 as signal 118 where, path 140 represents the direct (or prompt) path and 141 and 142 represent the echo paths. Remote unit 113 uses a RAKE receiver 161 to lock onto several multipath rays on the dowlink. In IS-95 the subscriber unit will lock to up to three rays. The receiver combines the several RAKE fingers together to form the demodulated information stream that is later decoded to recover the transmitted data. Internal to the RAKE receiver 161, a searcher will have knowledge of the time offsets and pilot power for each of the signal paths and assign a RAKE finger receiver to the signals on the communication signal paths. In the preferred embodiment of the present invention (utilizing IS-95A), the remote unit transmission of an uplink signal is required to be within ±1 μsec (microsecond) of the perceived first ray. Once received downlink communication signal 118 has been properly combined and decoded, remote unit 113 determines a proper time for transmission of uplink communication signal 119. In particular, in the preferred embodiment of the present invention, time alignment of remote unit 113 occurs as required in IS-95A section 6.1.5.1, by tracking a time reference to the earliest arriving ray being used for demodulation. Continuing, base station 101 receives transmitted uplink communication signal 119 over uplink communication signal paths 130–132 as signal 121, and determines what ray was utilized by remote unit 113 in time aligning uplink communication signal 119. In particular, there exists situations in which remote unit 113 is unable to resolve the prompt ray. As discussed above, the prompt ray may be attenuated in amplitude, or may be close enough in time to a subsequent ray that the receiver cannot resolve the two rays. Because of this, a remote unit may not time align to the prompt ray, causing an error to be introduced in any determination of round-trip delay. In the preferred embodiment of the present invention, base station 101 analyzes received uplink communication signal 121 and predicts the ray that remote unit 113 utilized for time alignment. (Further details of base station's 101 analysis will be discussed below in reference to FIG. 2). Once base station 101 has determined the ray that remote unit 113 utilized in time alignment, base station 101 corrects any calculation of round-trip delay accordingly.

Figure 2:
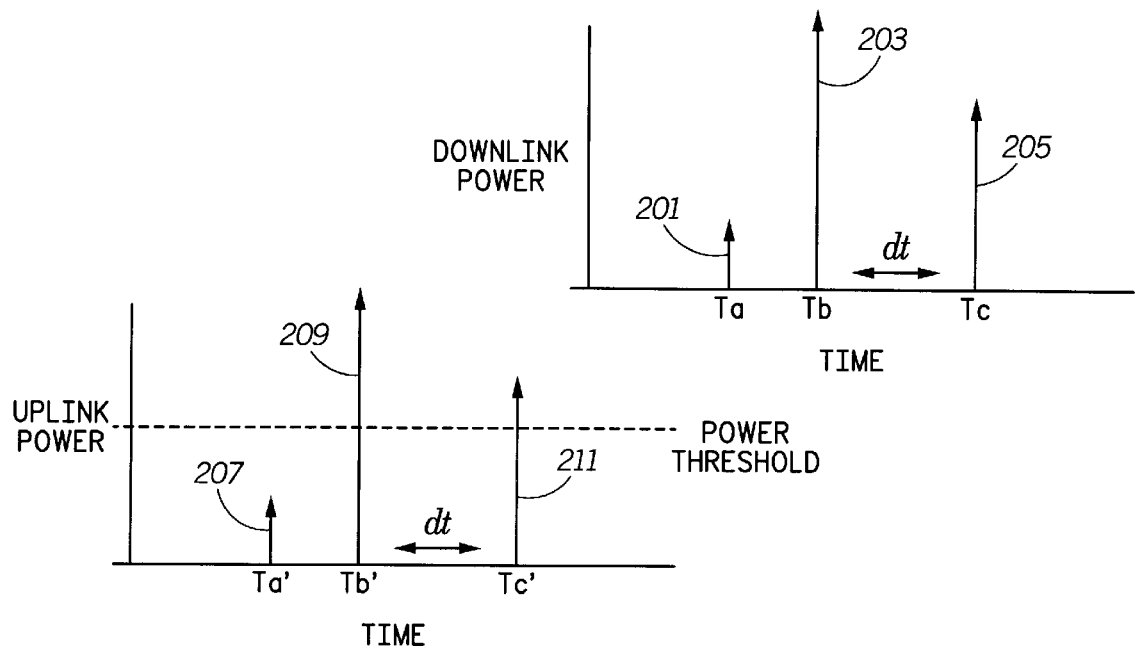
FIG. 2 and FIG. 3 illustrate reception of a signal that has undergone multipath scattering.

FIG. 2 illustrates transmission of downlink and uplink communication signals 116 and 119 over communication signal paths 140–142 and 130–132 respectively. As is evident, the delay profile shows that earliest rays (prompt rays) 201 and 207, that traveled over paths 140 and 130, respectively, are much lower in power than the largest ray 203 and 209, having traveled over paths 141 and 131, respectively. If remote unit 113 is unable to resolve prompt ray 201, (synchronizing to ray 203), base station 101 will overestimate any calculation of round-trip delay by Tb'−Ta' (the time span between reception of rays 207 and 209 which is equal to the time span between rays 201 and 203). In the preferred embodiment of the present invention, base station 101 analyzes uplink communication signal 121 and assumes that the average power delay profile of uplink communication signal 121 will be similar to the power delay profile of downlink communication signal 118. Additionally, because size and weight constraints for RAKE receivers are less stringent when implemented in base station 101, in the preferred embodiment of the present invention, base station 101 utilizes more complex RAKE receivers, resulting in a better ability to resolve low-power, close-in-time rays. In the preferred embodiment of the present invention base station 101 utilizes two RAKE receivers, one that uses a searching and finger assignment method similar to the subscriber unit and the second RAKE receiver that uses a super-resolution method such as that described in "Super-resolution of multipath channels in a spread spectrum location system", L. Dumont, M. Fattouche, G. Morrison, Electronic Letters, 15th September, Vol. 30, No. 19. The super-resolution method calculates what the subscriber should have ideally done for time referencing, whereas the simpler receiver would calculate what the subscriber actually did for time referencing.

In the preferred embodiment of the present invention, base station 101 analyzes rays 207–211 and estimates the specific ray 201–205 that remote unit 113 utilized in synchronization. In particular, base station 101 determines (1) an arrival time (T1) of a prompt ray, in FIG. 2, equal to Ta'; (2) an arrival time (T2) of a first ray, (received first in time) with a power level above a power threshold, in FIG. 2, equal to Tb'; (3) time offset (dt) between the first ray with a power level above the power threshold and a ray with a power level above the power threshold received closest in time to the first ray; and (4) a correction in round-trip delay time. For example, with reference to FIG. 2, base station 101 determines that (1) prompt ray is ray 207, (2) ray 209 is a first ray with a power level above the power threshold, and (3) dt is the time offset between the first ray with the power level above the power threshold and the ray 211 with a power level above the power threshold received closest in time to the first ray. In the preferred embodiment of the present invention, the power threshold is set to correspond to a pilot Ec/Io of approximately −22 dB as the subscriber generally will be unable to acquire rays below −25 dB as indicated in section 9.2 of IS-98 "Recommended Minimum Performance Standards for Dual-Mode Wideband Spread Spectrum Cellular Mobile Stations.

From the information obtained by analyzing the uplink power delay profile, base station 101 predicts a correction in time to compensate for remote unit synchronizing to a non-prompt ray. With reference to FIG. 2, base station 101 compensates for remote unit 113 synchronizing to the wrong ray by subtracting Tb'−Ta' from the observed round-trip propagation time. In other words, base station 101 analyzes multipath scattering characteristics of received uplink communication signal 121 and corrects any calculation of round-trip delay between base station 101 and remote unit 113 by a difference in time (T2−T1) between the prompt ray 207 and a first ray with a power level above the threshold (ray 209). By eliminating the error caused by remote unit 113 failing to time align to the prompt ray, determination of round-trip delay time is improved, resulting in a more accurate determination of remote unit location (via trilateration).

Figure 3:
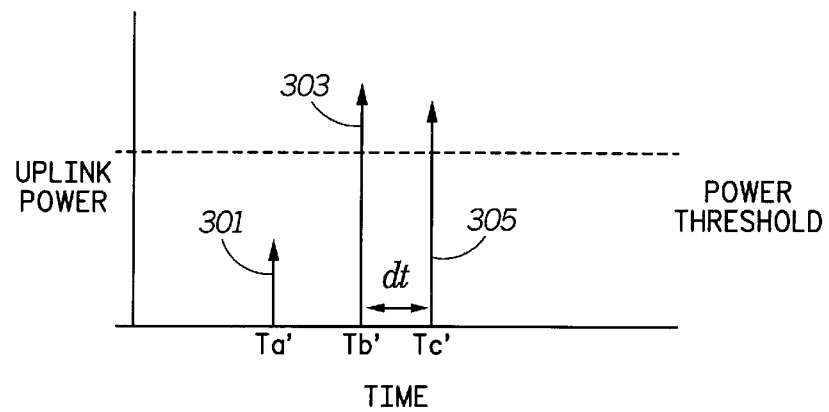

As mentioned above, in addition to remote unit 113 being unable to resolve a low-power ray, a remote unit 113 may fail to resolve a ray due to another ray being received close in time. Such a situation is shown in FIG. 3. As shown in FIG. 3, rays 303 and 305 are received by base station 101 very close in time, and if received by remote unit 113 in a similar manner, may be unable to be resolved by remote unit 113. Such a situation is commonly referred to as a fat finger, since remote unit's 113 inability to resolve rays 303 and 305 will cause the two rays to appear as a single, fat ray. Additionally, remote unit 113 will synchronize to a point in time between the two rays. Because of this, in the preferred embodiment of the present invention, base station 101 additionally compares dt to a time threshold, and if dt is below the threshold, compensates any prediction of round-trip delay accordingly. With reference to FIG. 3, base station 101 will determine dt=Tc'−Tb', and if dt is below the time threshold, base station 101 assumes that remote unit 113 actually utilized a point in time between rays 303 and 305 in synchronization. In the preferred embodiment of the present invention, if dt is determined to be below the time threshold, then base station 101 assumes that remote unit 113 synchronized to a point in time ½ way between rays 303 and 305 (Tb'+[(Tc'−Tb')/2]). The actual point in time that the subscriber synchronizes to will be a function of the method that the subscriber manufacturer has adopted. In general one will want to match the subscribers synchronization algorithm with what is utilized by the base station. This may involve various methods such as taking the relative power of the rays into consideration, e.g., synchronizing to a point in time equal to Tc'−[P1/(P1+P2)](Tc'−Tb') wherein linear weighting with respect to power is used, and where P1 and P2 are the powers of rays 303 and 305, respectively. Once base station 101 determines the point in time utilized by remote unit 113 during synchronization, base station 101 predicts a correction in time to compensate any estimation of round-trip delay. With reference to FIG. 3, base station 101 compensates for remote unit 113 synchronizing to the wrong ray by subtracting [Tb'+(Tc'−Tb')/2]−Ta' from the observed round-trip propagation time.

Figure 4:
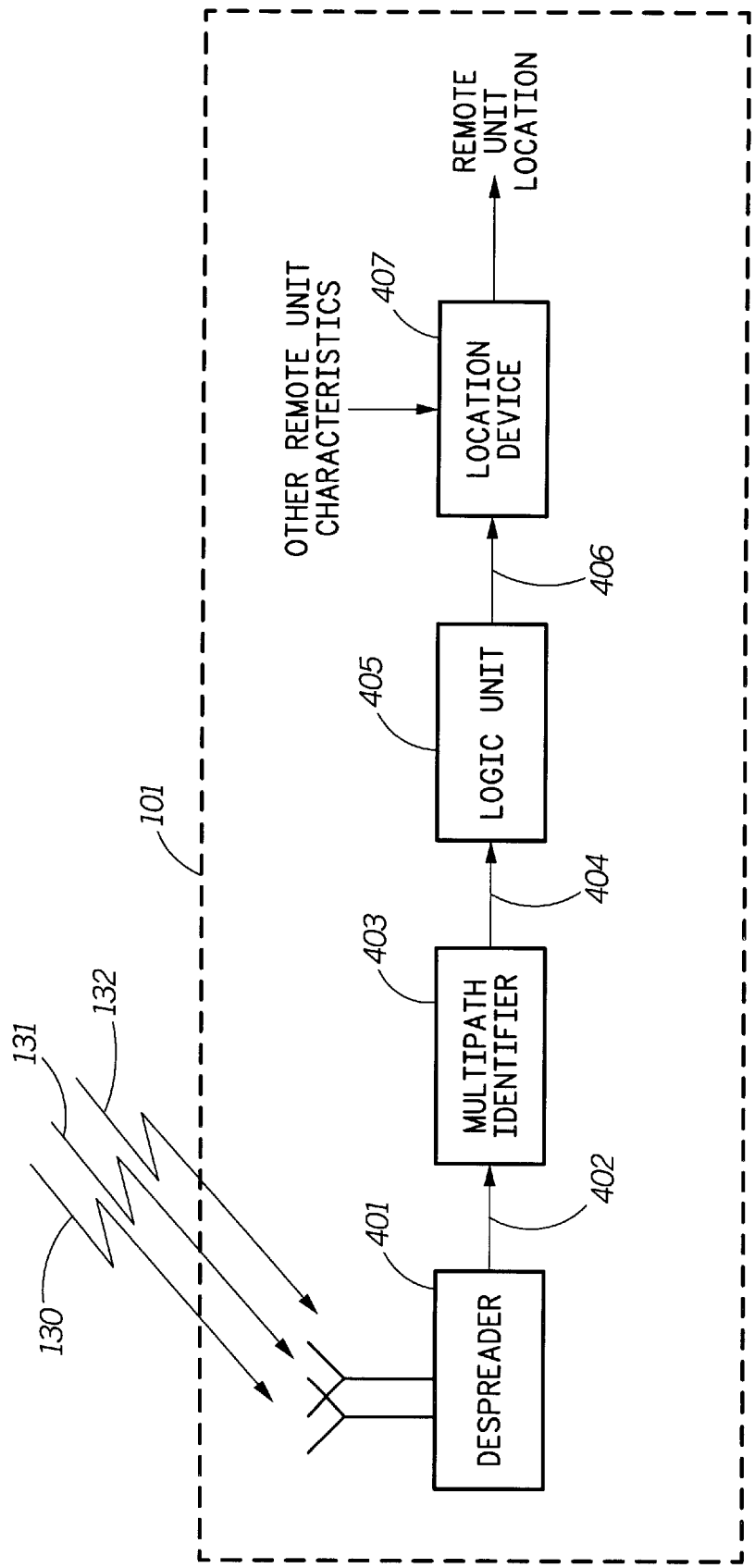
FIG. 4 is a block diagram of the base station of FIG. 1 in accordance with the preferred embodiment of the present invention.

FIG. 4 is a block diagram of the base station of FIG. 1 in accordance with the preferred embodiment of the present invention. Base station 101 comprises despreader 401, multipath identifier 403, logic unit 405, and location device 407. Operation of base station 101 occurs as follows: signal 121 enters despreader 401. As discussed above, signal 121 comprises a coded (spread) signal which has undergone multipath scattering over signal communication paths 130–132. Despreader 401 despreads signal 121 to form signal 402 comprising a despread signal representative of signal 121. In the preferred embodiment of the present invention signal 402 is formed by despreading signal 121 with the appropriate despreading code (Pseudo-Noise (PN) Code, Walsh Codes and any data that was present) to strip the spreading code from signal 121.

Signal 402 is then input into multipath identifier 403. Multipath identifier 403 determines multipath characteristics for signal 121, which arise from the correlation peaks of the prompt signal and the various echoes. These multipath characteristics include, but are not limited to, time delays and respective amplitudes and phases between correlation peaks for each signal. For a general background on identification of multipath components in communication systems, reference is made to "INTRODUCTION TO SPREAD-SPECTRUM ANTIMULTIPATH TECHNIQUES AND THEIR APPLICATION TO URBAN DIGITAL RADIO" by Turin, published in the Proceedings of the IEEE, Vol. 68, No. 3, March 1980. Multipath characteristics 404 are output from multipath identifier 403 and enter logic unit 405. Logic unit 405 utilizes multipath characteristics 404 to derive a correction for round-trip delay between remote unit 113 and base station 101. The correction factor is then output to location device 407 and utilized to compensate the observed round-trip propagation time accordingly. In the preferred embodiment of the present invention, remote unit 113 location is determined as described in Ghosh et al.

Figure 5:
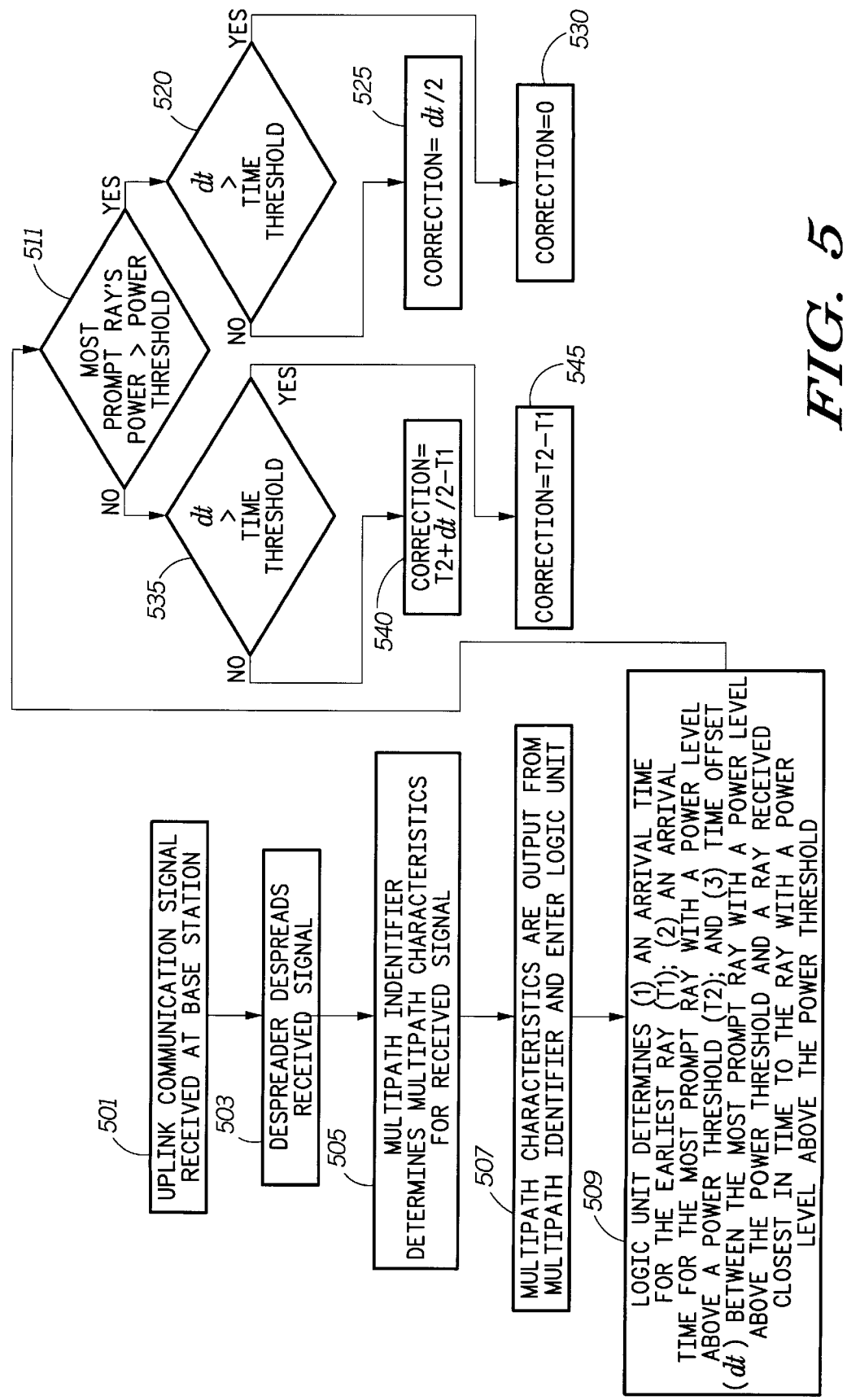
FIG. 5 is a flow chart illustrating a method of operating the base station of FIG. 1 in accordance with the preferred embodiment of the present invention.

FIG. 5 is a flow chart illustrating a method of operating the base station of FIG. 1 in accordance with the preferred embodiment of the present invention. At step 501 communication signal 119, having undergone multipath scattering is received at base station 101 as signal 121 and enters despreader 401. At step 503, despreader 401 despreads signal 121 to form signal 402 comprising a despread signal representative of signal 121. As discussed above, in the preferred embodiment of the present invention signal 402 is formed by despreading signal 121 with the appropriate despreading code (Pseudo Noise (PN) Code) to strip the spreading code and data modulation from signal 121.

Continuing, next at step 505 signal 402 is then input into multipath identifier 403 where multipath identifier 403 determines multipath characteristics for signal 121, which arise from the correlation peaks of the various echoes. As discussed above, these multipath characteristics include, but are not limited to, time delays and respective amplitudes and phases between correlation peaks for each signal. At step 507, multipath characteristics 404 are output from multipath identifier 403 and enter logic unit 405. Logic unit 405 utilizes multipath characteristics 404 to derive a correction for round-trip delay between remote unit 113 and base station 101. In particular, at step 509 logic unit 405 determines (1) an arrival time for the prompt ray (T1); (2) an arrival time for the first ray (T2) with a power level above a power threshold; and (3) time offset (dt) between the first ray with a power level above the power threshold and a ray with a power level above the power threshold received closest in time to the first ray.

Continuing, at step 511 logic unit 405 determines if the prompt ray is above the power threshold, and if so the logic flow continues to step 520 where logic unit 405 determines if dt is above a time threshold. As discussed above, having dt below the time threshold will cause the two rays to appear by remote unit 113 as a single, fat ray, causing remote unit 113 to synchronize to a point in time between the two rays. Because of this, if dt is below the threshold, logic unit 405 assumes that remote unit 113 actually utilized a point in time between two rays and a correction factor is set to dt/2 (step 525), otherwise the correction factor is set to zero (step 530). Returning to step 511, if logic unit 405 determines that the prompt ray is not above the power threshold, then the logic flow continues to step 535 where logic unit 405 determines if dt is above the time threshold. If, at step 535 logic unit determines that dt is above the time threshold, then the logic flow continues to step 545 where a correction factor is set to T2−T1, otherwise the logic flow continues to step 540 where the correction factor is set to T2+dt/2−T1.

Once logic unit 405 determines the correction factor to compensate any estimation of round-trip delay, the correction factor is passed to location device 407 where it is utilized to compensate for remote unit 113 synchronizing to the wrong ray by subtracting the correction factor from the observed round-trip propagation time. By eliminating the error caused by remote unit 113 failing to time align to the prompt ray, determination of round-trip delay time is improved, resulting in a more accurate determination of remote unit location (via trilateration).

While the invention has been particularly shown and described with reference to a particular embodiment, it will be understood by those skilled in the art that various changes in form and details may be made therein without departing from the spirit and scope of the invention, and it is intended that any such change come within the scope of the following claims.

What is claimed is:

1. A method for correcting a measured round-trip delay time of a signal transmitted in a wireless communication, the method comprising the steps of:

transmitting a first signal to a remote unit;

receiving a second signal from the remote unit, the second signal transmitted in response to the first signal being received at the remote unit, the second signal additionally undergoing multipath scattering prior to being received;

calculating a round-trip delay time, the round-trip delay time being substantially equal to a time between transmission of the first signal and reception of the second signal;

determining a correction factor in the round-trip delay time, wherein the correction factor is based on an estimation of a point in time that the remote unit synchronized to and a point in time the remote unit should have synchronized to; and correcting the round-trip delay time based on the correction factor.

2. The method of claim 1 wherein the step of determining the correction factor in the round-trip delay time further comprises the step of determining the correction factor based on power levels and time characteristics of received rays transmitted from the remote unit.

3. The method of claim 1 wherein the step of determining the correction factor in the round-trip delay time further comprises the step of determining the correction factor based on a time offset (dt) between the first ray with a power level above the power threshold and a ray with the power level above the power threshold received closest in time to the first ray.

4. The method of claim 1 wherein the step of receiving the second signal from the remote unit comprises the step of receiving the second signal utilizing a RAKE receiver.

5. The method of claim 1 wherein the step of determining the correction factor in the round-trip delay time further comprises the step of determining a correction factor in the round-trip delay time based on a difference in time between the prompt ray and the first ray with the power level above the power threshold.

6. A method for correcting a measured round-trip delay time of a signal transmitted in a wireless communication, the method comprising the steps of:

receiving a signal having undergone multipath scattering;

determining an arrival time (T1) for a prompt ray;

determining an arrival time (T2) for a first ray with a power level above a power threshold;

determining a time offset (dt) between the first ray with the power level above the power threshold and a ray received closest in time to the first ray;

determining a correction factor based on the arrival time for the prompt ray, the arrival time for the first ray with the power level above the power threshold, and the time offset between the first ray with the power level above the power threshold and the ray with the power level above the power threshold received closest in time to the first ray; and correcting the round-trip delay time based on the correction factor.

7. The method of claim 6 wherein the step of determining the correction factor comprises determining the correction factor substantially equal to dt/2.

8. The method of claim 6 wherein the step of determining the correction factor comprises determining the correction factor substantially equal to T2−T1.

9. The method of claim 6 wherein the step of determining the correction factor comprises determining the correction factor substantially equal to T2+dt/2−T1.

10. The method of claim 6 wherein the step of receiving comprises the step of receiving utilizing a RAKE receiver.

11. An apparatus for correcting a measured round-trip delay time in a wireless communication system, the apparatus comprising:

a multipath identifier having outputting multipath characteristics of a received signal;

a logic unit having the multipath characteristics of the received signal as an input, and outputting a correction factor, the correction factor based on an arrival time for a prompt ray, an arrival time for a first ray with a power level above a power threshold, and a time offset between the first ray with the power level above the power threshold and a ray with the power level above the power threshold received closest in time to the first ray; and a location device having as an input the correction factor, and outputting a corrected round-trip delay.

* * * * *